United States Patent
Hori et al.

(10) Patent No.: US 6,441,871 B1
(45) Date of Patent: Aug. 27, 2002

(54) METHOD FOR CORRECTING AMPLITUDE OF SYNCHRONIZING SIGNAL OF COMPOSITE VIDEO SIGNAL AND DEVICE THEREFOR

(75) Inventors: Masahiro Hori, Kusatsu; Hiroaki Kubo, Ohmihachiman, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/385,018

(22) Filed: Aug. 30, 1999

(30) Foreign Application Priority Data

Aug. 31, 1998 (JP) .......................................... 10-245493

(51) Int. Cl.[7] .............................. H04N 5/18; H04N 5/16
(52) U.S. Cl. ...................................... 348/691; 348/697
(58) Field of Search .................................... 348/691, 695, 348/696, 697, 689, 682, 684, 521, 525, 528, 532, 533, 534; H04N 5/18, 5/16

(56) References Cited

U.S. PATENT DOCUMENTS

| | | | |
|---|---|---|---|
| 3,207,998 A | * 9/1965 | Corney et al. | 348/697 |
| 4,470,066 A | * 9/1984 | Wolber et al. | 348/691 |
| 4,742,392 A | * 5/1988 | Hashimoto | 348/695 |
| 5,258,842 A | * 11/1993 | Nishikawa | 348/691 |

* cited by examiner

Primary Examiner—Michael H. Lee
(74) Attorney, Agent, or Firm—Gail H. Zarwick, Esq.; McGinn & Gibb, PLLC

(57) ABSTRACT

A method and device are provided for correcting an amplitude of a synchronizing signal. A pedestal voltage, Vped, (i.e., a reference level) may be detected which repetitively occurs at the same period as a synchronizing signal of an input composite video signal. A reference voltage, Vsync, may be generated corresponding to an amplitude of the synchronizing signal which meets a standard for the input composite video signal. A DC voltage, Vh, may be generated having a voltage level corresponding to a tip or peak level of the synchronizing signal which meets the standard for the input composite video signal based on the pedestal voltage, Vped, and the reference voltage, Vsync. The DC voltage Vh and the composite video signal may be switchably output in synchronism with the synchronizing signal extracted from the composite video signal.

21 Claims, 4 Drawing Sheets

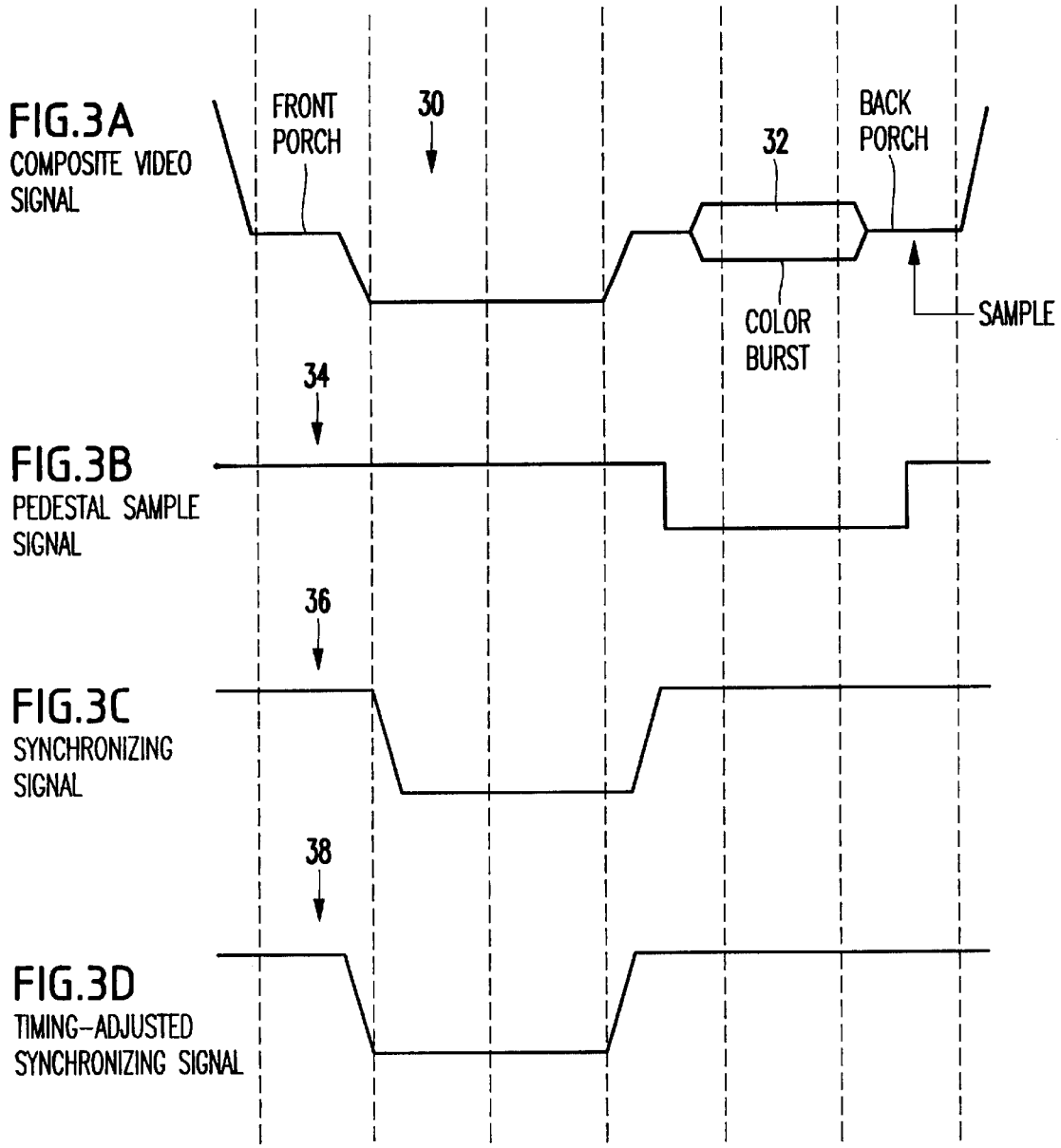

METHOD FOR CORRECTING AMPLITUDE OF SYNCHRONIZING SIGNAL OF COMPOSITE VIDEO SIGNAL AND DEVICE THEREFOR

BACKGROUND OF THE INVENTION

1. Field of the Invention

The present invention generally relates to a method and device for correcting amplitude of a synchronizing signal of a composite video signal. More particularly, the invention relates to a method and device for correcting only the amplitude of a synchronizing signal to meet a standard without affecting video and color burst signals.

2. Description of the Related Art

Conventional systems utilize composite video signals which are used in various video apparatuses such as television sets or video tape recorders. The composite video signals are composed of a video signal such as a luminance signal and a chrominance signal, a color-burst signal such as a color synchronizing signal, and a synchronizing signal such as horizontal and vertical synchronizing signals.

Multiple video amplifiers and video switches are incorporated into modem video apparatuses. If the amplitude of a video signal is dynamically and significantly changed when a composite video signal passes through an amplifier, the amplitude of a synchronizing signal may be dynamically changed. If this occurs, then the amplitude of the synchronizing signal may be decreased depending on the state of video signal, and thus the composite video signal processing circuits in subsequent stages may fail to detect the synchronizing signal. In consequence, part of the screen image may be horizontally disordered or the whole screen image may momentarily swing in the vertical direction.

Two approaches are generally used to address the problem of a decreasing amplitude of a synchronizing signal. First, the whole composite video signal may be amplified using an amplifier in advance so that at least a required amplitude of a synchronizing signal can be secured even when the amplitude of the synchronizing signal dynamically decreases. Second, video circuits may be evaluated in a predetermined device configuration, and if no problem arises, it may be determined that the video circuits are acceptable. However, in the first approach, since the whole waveform is amplified, not only a synchronizing signal but also a video signal is amplified. In consequence, the reproducibility of an original video signal may be impaired, or gradation of white portions of a video image may be lost as a result that the amplified video signal is clipped by composite video signal processing circuits in subsequent stages. In the second approach, even though no problem was found in the device configuration used for the evaluation, problems may occur after shipping depending on user's device configuration or the type of television monitor on the market.

SUMMARY OF THE INVENTION

In view of the foregoing and other problems of the conventional methods, it is, therefore, an object of the present invention to provide a method and a device for correcting amplitude of a synchronizing signal of a composite video signal without affecting other signal components.

It is also an object of the present invention to correct only the amplitude of a synchronizing signal to meet a standard without affecting video and color burst signals.

The present invention may include detecting a reference level which repetitively occurs at the same period as a synchronizing signal of the input composite video signal. A reference voltage may be generated corresponding to the amplitude of the synchronizing signal which meets a standard for the composite video signal. A DC voltage may be generating having a voltage level corresponding to a peak level of the synchronizing signal which meets the standard for the composite video signal based on the reference level and the reference voltage. The composite video signal and the DC voltage may be output in synchronism with the synchronizing signal extracted from the composite video signal.

The present invention may include a reference level detecting device for detecting a reference level which repetitively occurs at the same period as the synchronizing signal of the input composite video signal and a reference-voltage generating device for generating a reference voltage corresponding to an amplitude of the synchronizing signal which meets a standard for the input composite video signal. An arithmetic device generates a DC voltage having a voltage level corresponding to a peak level of the synchronizing signal which meets the standard for the input composite video signal based on the reference level and the reference voltage. An output switching device selectively outputs the composite video signal and the DC voltage in synchronism with the synchronizing signal extracted from the composite video signal.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings in which like reference numerals refer to like elements and wherein:

FIGS. 3(*a*) to (*d*) are waveforms of signals appearing at selected circuit points of the device shown in FIG. 1;

FIG. 4(*b*) is a waveform of a composite video signal after correcting the amplitude of a synchronizing signal.

DETAILED DESCRIPTION OF PREFERRED EMBODIMENTS OF THE INVENTION

With reference to the accompanying drawings, embodiments of the method and the device for correcting an amplitude of a synchronizing signal of a composite video signal according to the present invention are described below.

In the embodiments, the pedestal level of the composite video signal is preferably detected as a reference level, which repetitively occurs at a same period as a synchronizing signal.

Figure 1:
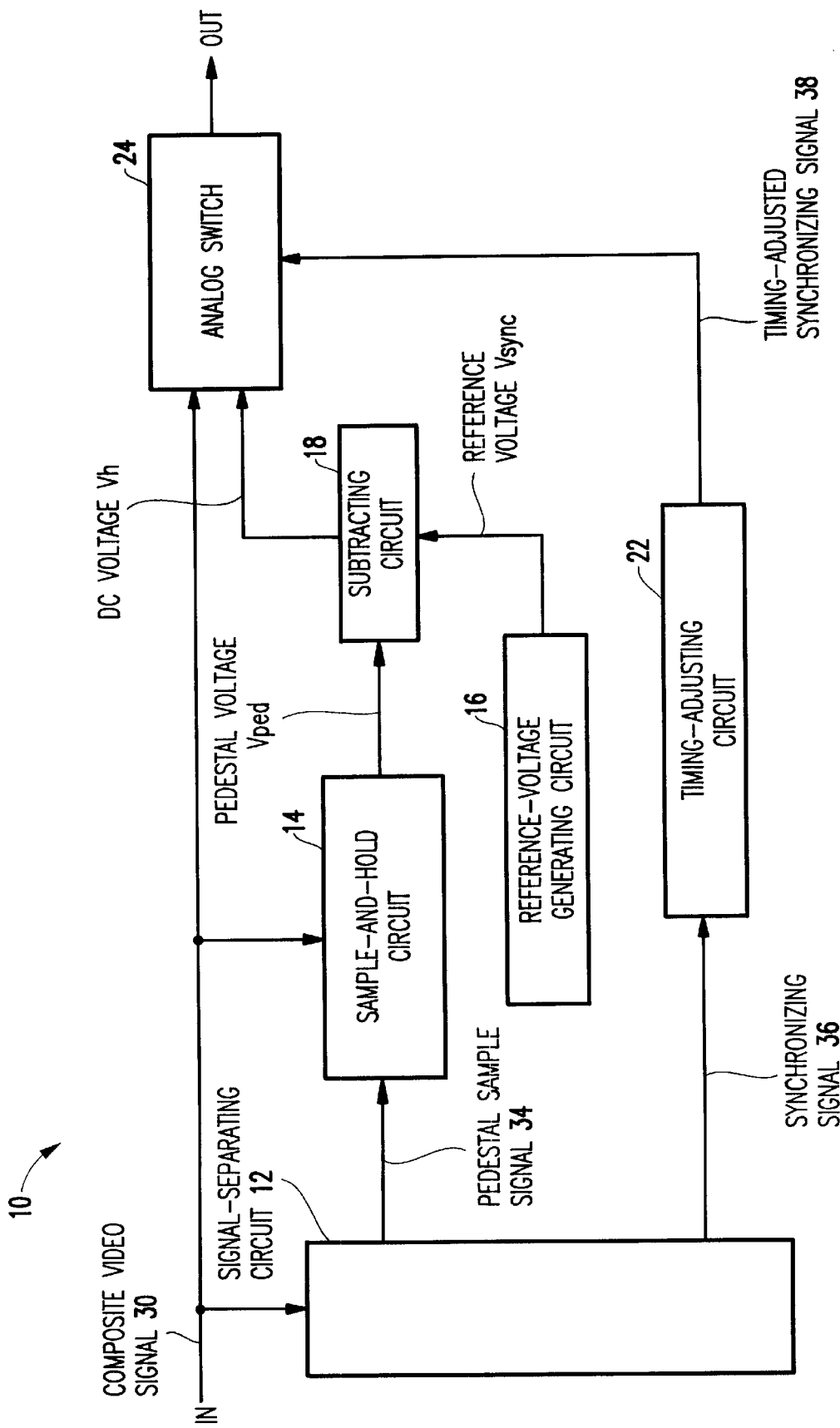
FIG. 1 is a schematic block diagram illustrating a device for correcting amplitude of a synchronizing signal according to the present invention.

FIG. 1 shows a device 10 for correcting amplitude of a synchronizing signal according to the present invention. The device includes a signal-separating circuit 12, a sample-and-hold circuit 14, a reference-voltage generating circuit 16, a subtracting circuit 18, a timing-adjusting circuit 22, and an analog switch 24. A composite video signal 30 is transmitted to the signal-separating circuit 12, the sample-and-hold circuit 14, and the analog switch 24. An output of the signal-separating circuit 12 (i.e., a pedestal sample signal 34) is input to the sample-and-hold circuit 14. Another output of the signal-separating circuit 12 (i.e., a synchronizing signal 36) is input to the timing-adjusting circuit 22. Outputs of the sample-and-hold circuit 14 and the reference-voltage generating circuit 16 are input to the subtracting circuit 18, respectively. Outputs of the subtracting circuit 18 and the timing-adjusting circuit 22 are input to the analog switch 24, which outputs the corrected composite video signal.

Figure 2:
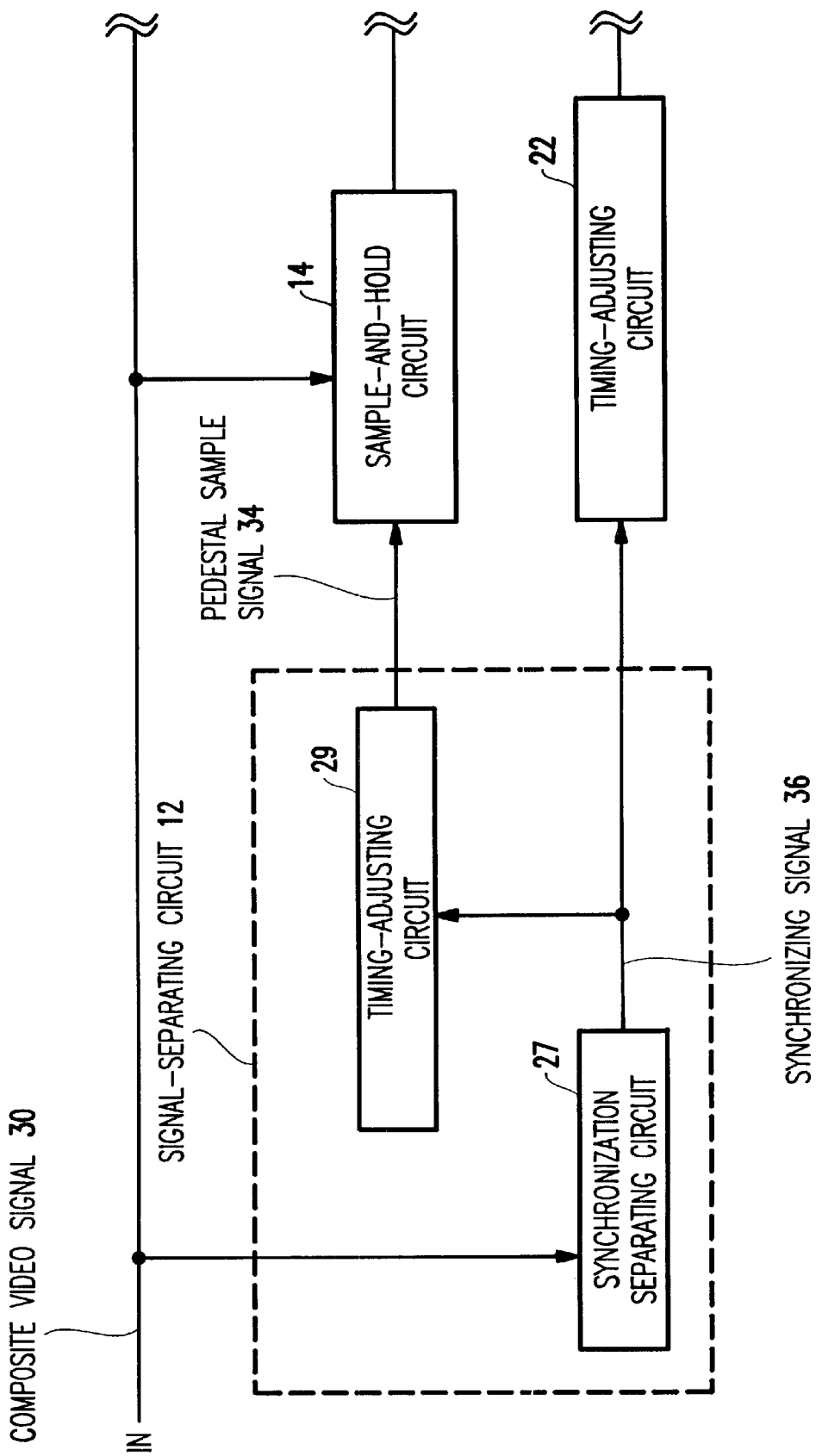
FIG. 2 is a schematic block diagram illustrating a signal-separating circuit for the device shown in FIG. 1.

The signal-separating circuit 12 generates (or extracts) the synchronizing signal 36 and the pedestal sample signal 34 from the input composite video signal 30. As shown in FIG. 2, any suitable synchronizing signal-separating circuit 27 can be used for generating the synchronizing signal 36. The pedestal sample signal 34 can be generated by the synchronizing signal-separating circuit 27 and the timing-adjusting circuit 29 connected to the synchronizing signal-separating circuit 27 as shown in FIG. 2, for example. As shown in FIG. 3(*b*), the pedestal sample signal 34 can be generated by adjusting a timing of the synchronizing signal 36. Since the timing can be variously adjusted, it is possible to set a detecting point freely in accordance with the reference level.

The sample-and-hold circuit 14 detects the pedestal voltage, Vped (i.e., the reference level), of the input composite video signal 30 using the pedestal sample signal 34. The reference-voltage generating circuit 16 generates the reference voltage, Vsync, corresponding to the standardized amplitude of the synchronizing signal. Any voltage generating device can be used as a reference-voltage generating circuit 16. A subtracting circuit 18 generates a DC voltage having a voltage level, Vh, corresponding to the tip or peak level of the synchronizing signal which meets the standard for the composite video signal 30 based on the pedestal voltage Vped (i.e., the reference level) and the reference voltage Vsync. The DC voltage, Vh, may be obtained by subtracting the reference voltage, Vsync, from the pedestal voltage, Vped, using any suitable subtracting circuit.

The timing-adjusting circuit 22 may adjust the timing of the synchronizing signal 36 so as to correspond to the synchronizing signal of the composite video signal 30. Any timing-adjusting device can be used as the timing-adjusting circuit 22. The analog switch 24 may selectively output the DC voltage, Vh, yielded by the subtracting circuit 18 and the composite video signal 30 in synchronism with the adjusted synchronizing signal 38. Any switching device can be used as the analog switch 24. The analog switch 24 may output the DC voltage, Vh, during the synchronizing period of the synchronizing signal 38.

Operations for correcting the amplitude of a synchronizing signal of a composite video signal using the device 10 will now be described.

When the composite video signal 30 shown in FIG. 3(*a*) is input to the device 10, the signal-separating circuit 12 generates the synchronizing signal 36 shown in FIG. 3(*c*) and the pedestal sample signal 34 shown in FIG. 3(*b*). The pedestal sample signal 34 is transmitted to the sample-and-hold circuit 14, and the synchronizing signal 36 is transmitted to the timing-adjusting circuit 22. Using the pedestal sample signal 34, the sample-and-hold circuit 14 detects the pedestal voltage, Vped, of the input composite video signal 30. In this embodiment, the pedestal voltage, Vped, may be detected at the back porch as shown in FIGS. 3(*a*) and 3(*b*) or it may also be detected at the front porch. Reference voltage, Vsync, corresponding to the standardized amplitude of the synchronizing signal, may be generated by the reference-voltage generating circuit 16. The reference voltage, Vsync, and the pedestal voltage, Vped, detected by the sample-and-hold circuit 14 are transmitted to the subtracting circuit 18. In the subtracting circuit 18, the DC voltage, Vh, is generated by subtracting the reference voltage, Vsync, from the pedestal voltage Vped (Vh=Vped−Vsync).

The timing-adjusting circuit 22 corrects the delay of the input synchronizing signal 36 and outputs the synchronizing signal 38 as shown in FIG. 3(*d*). Generally, when the synchronizing signal 36 is separated from the composite video signal 30 in the synchronizing signal-separating circuit 27, the. generated synchronizing signal is slightly delayed from the original synchronizing signal 36 as shown in FIG. 3(*c*). Therefore, timing of the delayed synchronizing signal is corrected in the timing-adjusting circuit 22 in order that the extracted synchronizing signal 36 can be synchronous with the synchronizing signal of the composite video signal 30.

The timing-adjusted synchronizing signal 38 and the DC voltage Vh (Vh=Vped−Vsync) generated in the subtracting circuit 18 are respectively transmitted to the analog switch 24. Simultaneously, the composite video signal 30 is also transmitted to the analog switch 24. In coincidence with timing of the timing-adjusted synchronizing signal 38, the analog switch 24 switchably outputs the composite video signal 30 and the DC voltage Vh. Accordingly, during a period other than the synchronizing period, the input composite video signal 30 is output, whereas the DC voltage, Vh, generated by the subtracting circuit 18 is output during the synchronizing period. Thus, the amplitude of the synchronizing signal of the output composite video signal can be corrected into the standardized amplitude (Vsync) without depending on the synchronizing signal.

Figure 4A:
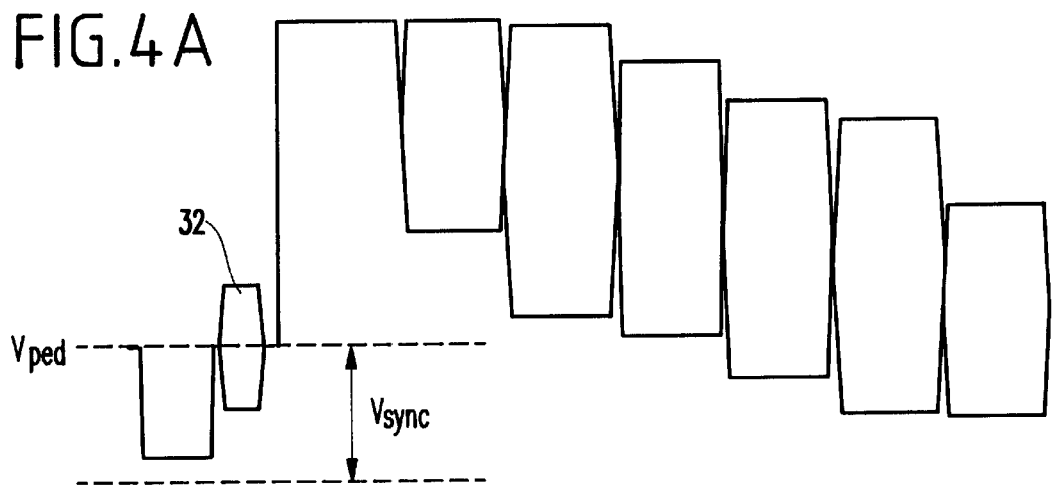
FIG. 4(*a*) is a waveform of a composite video signal with its synchronizing signal undesirably decreased.
Figure 4B:
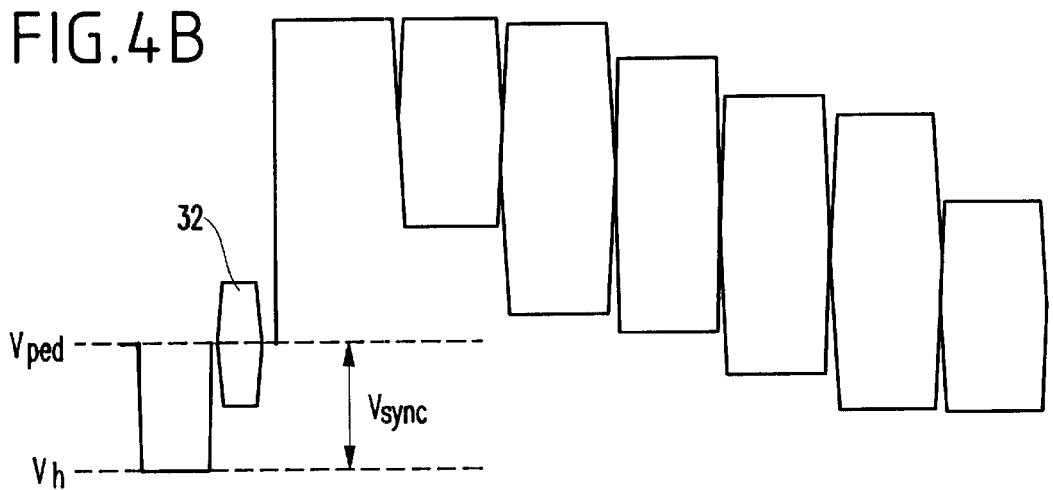

Accordingly, it is possible to extract only the horizontal and vertical synchronizing signals and correct the amplitude thereof to meet the standard without affecting video and color-burst signals. When the amplitude of synchronizing signal decreases as shown in FIG. 4(*a*), only the amplitude of synchronizing signal may be corrected into a standard value (Vsync) as shown in FIG. 4(*b*). The composite video signal containing a synchronizing signal which meets the standard can be transmitted to any receiving unit.

Figure 5:
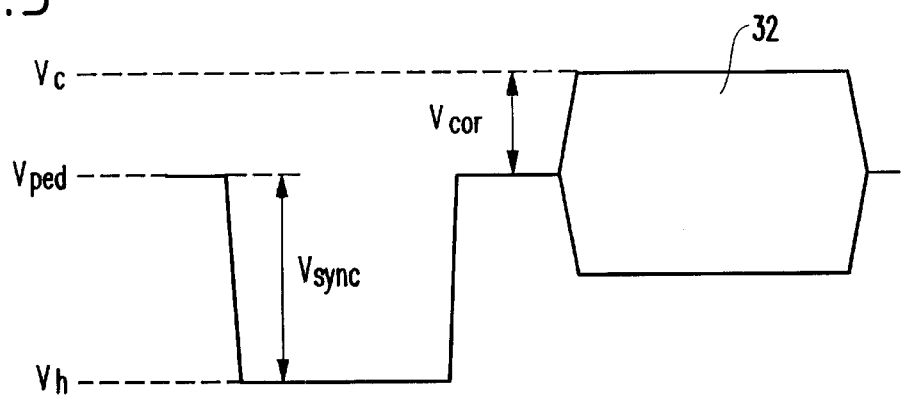
FIG. 5 is a waveform chart showing an example of computing a DC voltage Vh corresponding to the peak level of a synchronizing signal which meets a standard when the reference level is set to the peak of a color burst signal.

The method and device for correcting the amplitude of a synchronizing signal according to the present invention may also be implemented in other forms. For example, the reference level detected by the sample-and-hold circuit (i.e., a reference-level detecting device) is not limited to the pedestal level, but any level which repetitively occurs in the composite video signal at the same period as the synchronizing signal can be used as the reference level. As shown in FIG. 5, for example, it is also possible to set a reference level by sampling the peak level (Vc) of the color burst signal 32. In this case, assuming that voltage between the peak level (Vc) and the pedestal level (Vped) is Vcor, a DC voltage, Vh, corresponding to the tip or peak level of the synchronizing signal may be obtained which meets the standard by the subtracting circuit 18 as follows:

$$Vh=Vc-(Vcor+Vsync)$$

In order to detect the peak level of the color burst signal 32 in the device 10, the sampling point may be adjusted by the timing-adjusting circuit 29 of the signal-separating circuit 12.

Further, it is also possible to use a selector, or the like, rather than the analog switch 24 in order that a composite video signal can be output during a period other than the synchronizing period and the DC voltage having such a voltage level corresponding to the peak level of a synchronizing signal which meets the standard can be output during the synchronizing period.

It should be understood that the method and device for correcting the amplitude of a synchronizing signal according to the present invention are effectively applicable not only to the NTSC color TV system adopted in the United States of America and Japan, but also to the PAL color TV system adopted in European countries and China and the SECAM color TV system adopted in East European countries.

The present invention operates to gate the synchronizing signal having the standardized amplitude in place of the synchronizing signal of the input composite video signal. According to the present invention, the synchronizing signal having the standardized amplitude can be transmitted to any receiving unit.

The method for correcting the amplitude of a synchronizing signal may also be implemented by a digital-processing circuit, in which an input composite video signal is converted into a digital signal, and then the digital signal is processed by a digital circuit or an arithmetic unit using a CPU and then converted again into an analog signal.

The subject matter of Japanese Application No. 10-245493 filed Aug. 31, 1998 is incorporated herein by reference.

While the invention has been described with reference to specific embodiments, the description of the specific embodiments is illustrative only and is not to be considered as limiting the scope of the invention. Various other modifications and changes may occur to those skilled in the art without departing from the spirit and scope of the invention.

What is claimed is:

1. A method of correcting an amplitude of a synchronizing signal of a composite video signal, the method comprising:
   detecting a reference level that repetitively occurs at a same period as said synchronizing signal;
   generating a reference voltage corresponding to the amplitude of said synchronizing signal that meets a standard for said composite video signal;
   generating a DC voltage having a voltage level corresponding to a peak level of said synchronizing signal that meets the standard for said composite video signal based on said reference level and said reference voltage; and
   selectively outputting said composite video signal and said DC voltage from a switch in synchronism with the synchronizing signal.

2. The method of claim 1, wherein said reference level is a pedestal level.

3. The method of claim 1, further comprising adjusting a timing of the synchronizing signal to correspond to the synchronizing signal of said composite video signal.

4. The method of claim 1, wherein the DC voltage is output during a synchronizing period of said synchronizing signal.

5. The method of claim 1, wherein the composite video signal is output during a period other than a synchronizing period of said synchronizing signal.

6. The method of claim 1, the method further comprising extracting said synchronizing signal from said composite video signal.

7. The method of claim 1, the method further comprising extracting a pedestal sample signal from said composite video signal, wherein the reference level is determined based on said pedestal sample signal.

8. The method of claim 1, wherein the reference level corresponds to a reference level voltage and the DC voltage is obtained by subtracting the reference voltage from said reference level voltage.

9. A device for correcting an amplitude of a synchronizing signal of a composite video signal, the device comprising:
   reference level detecting means for detecting a reference level that repetitively occurs at a same period as said synchronizing signal;
   reference-voltage generating means for generating a reference voltage corresponding to the amplitude of said synchronizing signal that meets a standard for said composite video signal;
   arithmetic means for generating a DC voltage having a voltage level corresponding to a peak level of said synchronizing signal that meets the standard for said composite video signal based on said reference level and said reference voltage; and
   output means for selectively outputting said composite video signal and said DC voltage from a switch in synchronism with the synchronizing signal.

10. The device of claim 9, wherein said reference level is a pedestal level.

11. The device of claim 9, further comprising timing-adjusting means for adjusting a timing of the synchronizing signal to correspond to the synchronizing signal of said composite video signal.

12. The device of claim 9, wherein the output means outputs the DC voltage during a synchronizing period of said synchronizing signal.

13. The device of claim 9, wherein the output means outputs the composite video signal during a period other than a synchronizing period of said synchronizing signal.

14. The device of claim 9, further comprising signal-separating means for extracting said synchronizing signal from said composite video signal.

15. The device of claim 9, further comprising signal-separating means for extracting a pedestal sample signal from said composite video signal, wherein the reference level detecting means detects the reference level based on said pedestal sample signal.

16. The device of claim 9, wherein the reference level corresponds to a reference level voltage and the arithmetic means generates the DC voltage by subtracting the reference voltage from said reference level voltage.

17. A device for correcting an amplitude of a synchronizing signal of a composite video signal, the device comprising:
   a sample-and-hold circuit that detects a reference level that repetitively occurs at a same period as said synchronizing signal of said composite video signal;
   a reference-voltage generating circuit that generates a reference voltage corresponding to the amplitude of said synchronizing signal that meets a standard for said composite video signal;
   an arithmetic circuit connected to said reference voltage generating circuit and said sample-and-hold circuit, the arithmetic circuit outputting a DC voltage having a voltage level corresponding to a peak level of said synchronizing signal that meets the standard for said composite video signal based on the said reference level and said reference voltage; and
   a switch that receives the DC voltage output from said arithmetic circuit, the composite video signal and the synchronized signal and selectively outputs said composite video signal and said DC voltage in synchronism with the synchronizing signal.

18. The device of claim 17, wherein said reference level is a pedestal level.

19. The device of claim 17, further comprising a timing-adjusting circuit that adjusts a timing of the synchronizing signal to correspond to the synchronizing signal of said composite video signal.

20. The device of claim 17, wherein the switch outputs the DC voltage during a synchronizing period of said synchronizing signal.

21. The device of claim 17, wherein the switch outputs the composite video signal during a period other than a synchronizing period of said synchronizing signal.

* * * * *